United States Patent Office 3,488,145
Patented Jan. 6, 1970

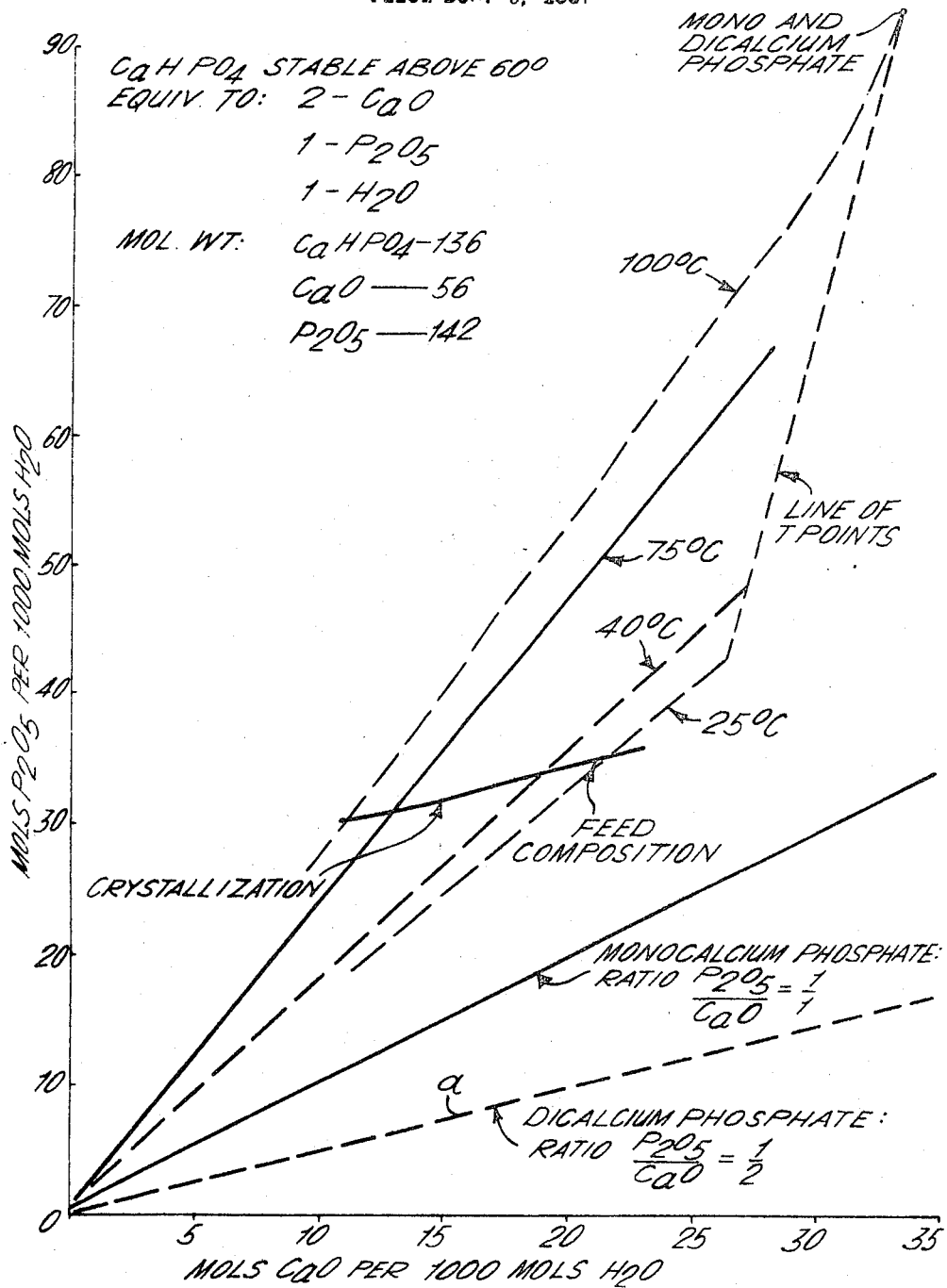

3,488,145
PRODUCTION OF DICALCIUM PHOSPHATE
Hans Svanoe, Warren, Pa., assignor to Struthers Scientific and International Corporation, a corporation of Delaware
Filed Dec. 5, 1967, Ser. No. 688,180
Claims priority, application Great Britain, Dec. 13, 1966, 55,810/66
Int. Cl. C01b 25/32
U.S. Cl. 23—109      2 Claims

ABSTRACT OF THE DISCLOSURE

A relatively cool mother liquor containing phosphoric acid has calcium carbonate dissolved in it after which the mother liquor is heated to crystallize out dicalcium phosphate as a product.

---

This invention relates to the production of dicalcium phosphate. Dicalcium phosphate with a crystal size of about ten microns with a high purity and a uniform crystal size is used as a raw material to make fluorescent lights. Conventionally, these crystals are produced by the following chemical reaction:

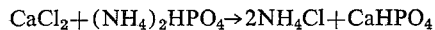

The raw materials used in this recation, calcium chloride and diammonium phosphate, are produced from raw materials at a considerable cost. If dicalcium phosphate can be made from calcium carbonate and electric furnace phosphoric acid, considerable savings will result in the cost of production.

It is, therefore, a main object of my invention to produce high purity and large size dicalcium phosphate crystals from calcium carbonate and electric furnace or wet process phosphoric acid.

Many other objects, advantages, and features of invention will become apparent from the following description and accompanying drawing wherein:

The figure is a graph of the solubility relationships for dicalcium phosphate expressed in mols of $P_2O_5$ and mols of CaO per 1000 mols of $H_2O$ at different temperatures.

Referring to the figure, it is to be noted that crystalline dicalcium phosphate is stable in phosphoric acid solution only. On the lower line, designated by the reference character $a$, there is indicated a composition equivalent to a $P_2O_5$ to CaO ratio in a dicalcium phosphate solution of one to two. The dicalcium salt is in the stable phase at a considerably higher ratio of $P_2O_5$ to CaO. For example, as indicated on the figure, while crystalline dicalcium phosphate combines in a $P_2O_5$ to CaO ratio of one to two, the solution in equilibrium with dicalcium phosphate at 75° C. has a ratio of 2.4 to 1.

Another important factor which is taken into consideration in the practice of this invention is that the solubility ratio of $P_2O_5$ to $CaO_1$ where dicalcium phosphate is in the solid stable phase, is dependent upon the temperature. For example, at 25° C. the solubility ratio is about 1.6 to 1 while at 100° C. it is increased to 2.7 to 1.

This invention takes advantage of these solubility characteristics by operating in the following manner. The process to produce dicalcium phosphate crystals is carried out at 75° C. in a mother liquor maintained at a ratio of $P_2O_5$ to CaO of 2.4 to 1. Thus in each 1000 mols of $H_2O$ of the mother liquor there is dissolved 30 mols of $P_2O_5$ and 12.5 mols of CaO.

To produce dicalcium phosphate in a continuous manner, $P_2O_5$ and CaO are added to this mother liquor in a ratio of 2 to 1 which is the same ratio in which they combine to produce dicalcium phosphate crystals.

To produce these crystals, the mother liquor at 75° C. is cooled to 40° C. in any suitable cooler. To this cooled mother liquor having 30 mols of $P_2O_5$ and 12.5 mols of CaO per 1000 mols of $H_2O$, there is added 3 mols of $P_2O_5$ in the form of phosphoric acid which can vary in strength from 25 to 70 percent $P_2O_5$ content and there is added 6 mols of CaO in the form of calcium hydroxide, calcium carbonate, or in any other suitable form. It is to be noted that part of the CaO may be added in the form of solid monocalcium phosphate or

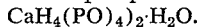

In this case the $P_2O_5$ which then becomes available is considered as a part of the 3 mols of $P_2O_5$ which is to be added. This enables a saving in cost of lime and sulphuric acid which would otherwise be required to produce the $P_2O_5$. When the mother liquor is cooled below 40° C. in the cooler, the added materials will dissolve. The mother liquor in the cooler may be cooled by cooling coils or by vacuum cooling.

The cooled mother liquor and the added dissolved materials are then passed to a crystallizer where the mother liquor is agitated and heated back to 75° C. As crystals form in the crystallizer, they are continuously pumped as a slurry through a filter or centrifuge from which the mother liquor is returned to the cooler to have more materials dissolved in it. Thus crystals of dicalcium phosphate are grown in a continuous process.

While a temperature of 75° C. has been indicated for the crystallizer and below 40° C. for the cooler-dissolver with a resulting temperature spread of 35° C., lower or higher temperature spreads may be used. However, with a higher temperature spread, the amount of mother liquor passing through the dissolver-cooler must be reduced. The crystallizer may operate from below 50° C. up to 100° C. or higher, but in all cases a temperature spread or difference of over 20° C. must be maintained between the crystallizer and the lower temperature cooler-dissolver.

As has been indicated, electric furnace or wet process phosphoric acid may be used to furnish the required $P_2O_5$. However, when wet process phosphoric acid is used as a raw material, a certain amount of purge will be required to remove impurities from the cycle. The amount of purge required will depend on the composition of the rock from which the phosphoric acid is made. Such impurities could be fluorosilicates and iron and aluminum phosphates.

Since dicalcium phosphate has an inverted solubility curve, it is most desirable to heat the mother liquor directly with sparged steam which is passed through the mother liquor as it enters the crystallizer. This eliminates heating coils having surfaces on which precipitated deposits may build up.

The strength of the mother liquor can be varied over a wide range from a specific gravity of less than 1.1 to a specific gravity of over 1.3. However, it is preferred to maintain the specific gravity of the mother liquor between 1.15 and 1.30 while substantially maintaining the ratio of $P_2O_5$ to CaO of 30 to 12.5.

In the practice of this invention, crystals of a size of ten microns and larger may be grown. Seed crystals are not needed and crystals of small size may be returned by a bypass to the cooler-dissolver to be redissolved in the mother liquor.

In summation, this invention involves the production of dicalcium phosphate crystals by the steps of providing a mother liquor at a temperature of between 50 and 100° C., the mother liquor having $P_2O_5$ and CaO dissolved in water in a ratio of about 2.4 to 1 and being of a specific gravity of between 1.15 and 1.30, cooling the mother liquor at least 20° C. and dissolving $P_2O_5$ and CaO therein in a ratio of two to one, reheating the mother liquor and dissolved materials to grow dicalcium phosphate crystals, and separating the crystals so grown from the mother liquor.

What is claimed is:
1. In the process of producing dicalcium phosphate crystals, the steps of:
   (a) providing a mother liquor of phosphoric acid having $P_2O_5$ dissolved therein to contain $P_2O_5$ and CaO in a ratio of 2.4 to 1, the mother liquor being an aqueous solution at a temperature between 50° and 100° C. and of a specific gravity between 1.15 and 1.30,
   (b) cooling the mother liquor at least 20° C,
   (c) dissolving $P_2O_5$ and CaO therein in a ratio of 2 to 1 in the form of phosphoric acid and calcium carbonate,
   (d) heating the mother liquor with the dissolved phosphoric acid and calcium carbonate therein to grow dicalcium phosphate crystals in the mother liquor, and
   (e) separating the crystals so grown from the mother liquor.
2. The combination according to claim 1 wherein the mother liquor in step (a) is at 75° C., is cooled in step (b) to 40° C., and is reheated in step (d) to 75° C.

References Cited
UNITED STATES PATENTS

| | | | |
|---|---|---|---|
| 2,948,590 | 8/1960 | Smalter et al. | 23—109 |
| 3,294,486 | 12/1966 | Cremer et al. | 23—109 |

HERBERT T. CARTER, Primary Examiner